(12) United States Patent
Rezanezhad Gatabi

(10) Patent No.: US 11,495,399 B2
(45) Date of Patent: Nov. 8, 2022

(54) PACKAGING TECHNIQUE FOR INDUCTIVE CONDUCTIVITY SENSORS

(71) Applicant: Javad Rezanezhad Gatabi, San Marcos, TX (US)

(72) Inventor: Javad Rezanezhad Gatabi, San Marcos, TX (US)

(73) Assignee: R-WATER LLC, San Marcos, TX (US)

( * ) Notice: Subject to any disclaimer, the term of this patent is extended or adjusted under 35 U.S.C. 154(b) by 0 days.

(21) Appl. No.: 15/876,088

(22) Filed: Feb. 20, 2018

(65) Prior Publication Data
US 2019/0228903 A1    Jul. 25, 2019

(51) Int. Cl.
| | | |
|---|---|---|
| H01F 27/32 | (2006.01) | |
| G01N 27/02 | (2006.01) | |
| H01F 27/28 | (2006.01) | |
| H01F 27/02 | (2006.01) | |
| H01F 27/36 | (2006.01) | |

(52) U.S. Cl.
CPC ......... *H01F 27/327* (2013.01); *G01N 27/025* (2013.01); *H01F 27/02* (2013.01); *H01F 27/2885* (2013.01); *H01F 27/36* (2013.01)

(58) Field of Classification Search
CPC .... G01N 27/023; G01N 27/025; G01R 27/02; H01F 27/02; H01F 27/2885; H01F 27/327; H01F 27/36
See application file for complete search history.

(56) References Cited

U.S. PATENT DOCUMENTS

| | | | | |
|---|---|---|---|---|
| 4,220,920 A | * | 9/1980 | Gross .................. | G01N 27/023 324/442 |
| 5,157,332 A | * | 10/1992 | Reese ................. | G01N 27/023 324/204 |
| 5,659,251 A | * | 8/1997 | Wakamatsu ......... | G01N 27/023 324/204 |
| 5,828,282 A | * | 10/1998 | Tiemann .............. | H01F 27/365 336/84 R |
| 7,126,343 B1 | * | 10/2006 | Howes, Jr. .......... | G01N 27/023 324/446 |
| 2006/0243050 A1 | * | 11/2006 | Quackenbush ...... | G01N 27/023 73/592 |
| 2009/0322358 A1 | * | 12/2009 | Imaizumi ............. | G01R 27/20 324/713 |
| 2013/0099808 A1 | * | 4/2013 | Li ........................ | G01N 27/07 324/722 |
| 2016/0155564 A1 | * | 6/2016 | Ortiz .................... | H01F 27/288 336/84 C |
| 2018/0106743 A1 | * | 4/2018 | Vogt .................... | G01N 27/08 |
| 2018/0216926 A1 | * | 8/2018 | Sanda .................. | G01B 7/023 |

* cited by examiner

*Primary Examiner* — Son T Le
*Assistant Examiner* — Adam S Clarke
(74) *Attorney, Agent, or Firm* — David S Nagy

(57) ABSTRACT

This invention presents a new packaging technique that allows for the use of a wider range of isolating materials for inductive conductivity sensors, thereby significantly reducing the cost of producing the sensors, improving their precision and accuracy, and increasing their sensitivity.

8 Claims, 5 Drawing Sheets

FIG. 1A - PRIOR ART
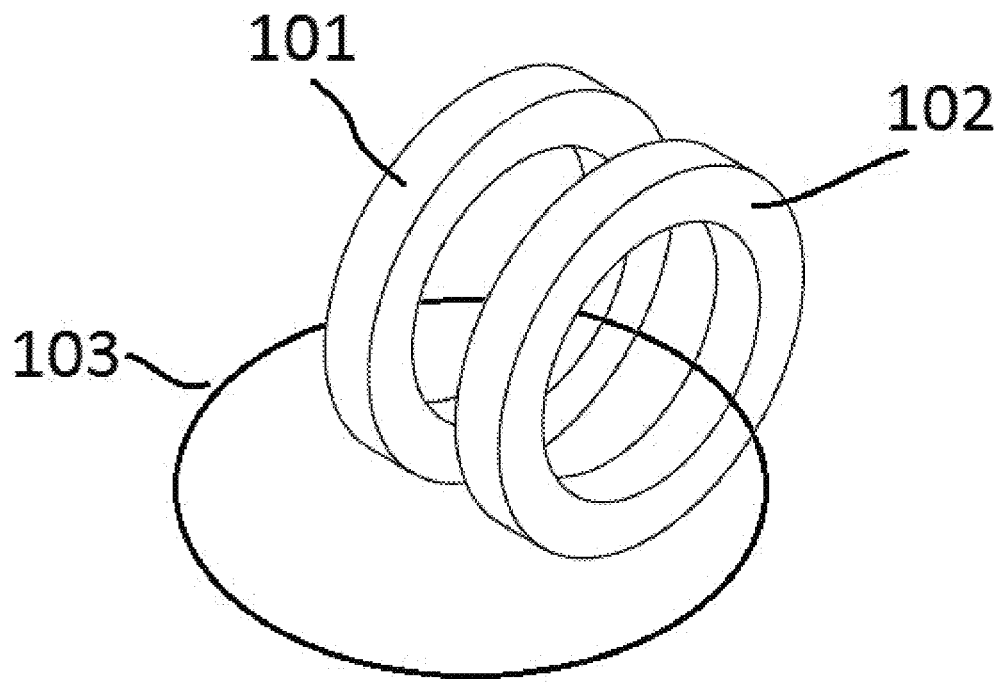
FIG. 1B - PRIOR ART
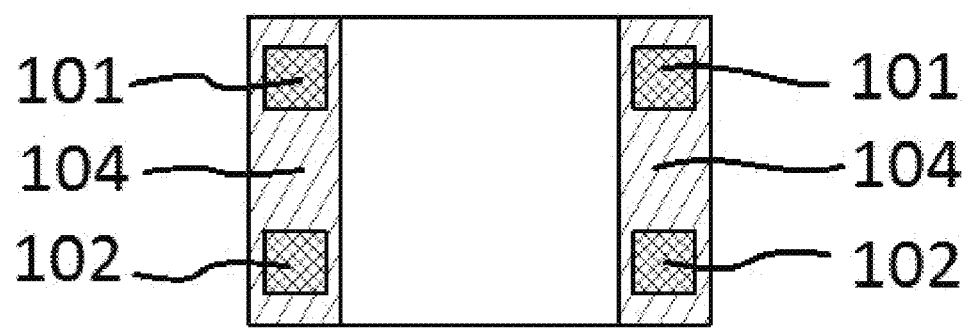

FIG. 2A - PRIOR ART
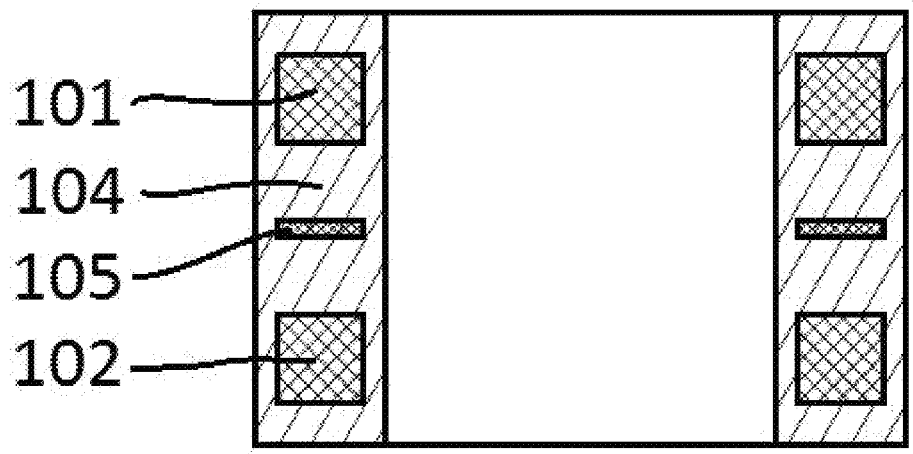
FIG. 2B - PRIOR ART
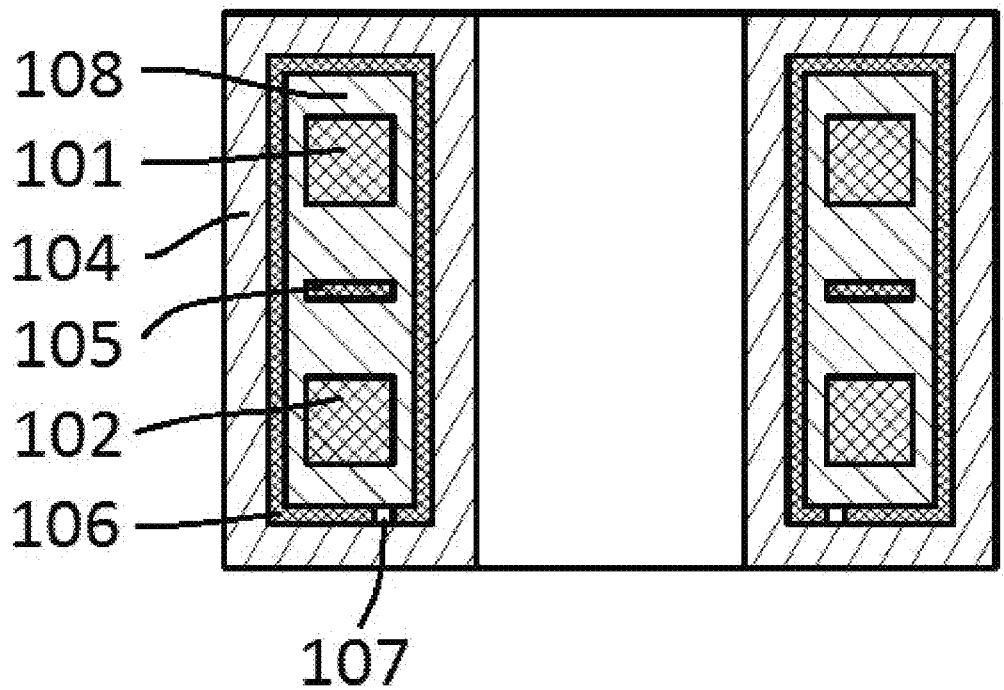

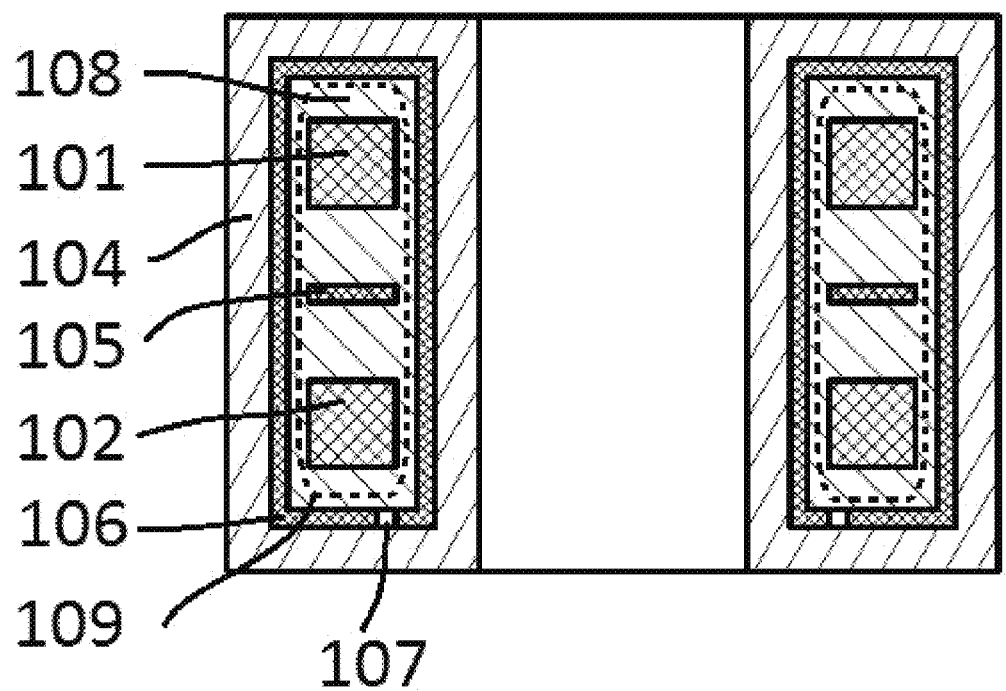
FIG. 3 - PRIOR ART

PACKAGING TECHNIQUE FOR INDUCTIVE CONDUCTIVITY SENSORS

CROSS-REFERENCE TO RELATED APPLICATIONS

Co-pending U.S. utility patent application Ser. No. 14/721,444, "Conductivity and Impedance Sensor", by the same inventor.

BACKGROUND OF THE INVENTION

Inductive conductivity sensors are widely used in quality monitoring and process control for many industrial and research applications. Non-contact, inductive conductivity sensors are of interest because of their immunity to chemical corrosion and maintaining their calibration for a longer period of time. The manufacturing process of conventional inductive conductivity sensors requires complicated, time-consuming, and expensive production steps. While the fundamental measurement concept is simple, the main complexity of the conductivity sensor comes from its packaging process.

This invention presents a new packaging technique that allows for the use of a wider range of isolating materials for inductive conductivity sensors, which will significantly reduce the cost of producing the sensor and increase its sensitivity. It will combine exceptionally advantageously with the conductivity and impedance sensors that are the subject of this inventor's co-pending application Ser. No. 14/721,444, and the disclosure of that application is incorporated herein be reference.

BRIEF SUMMARY OF THE INVENTION

The polymers employed to isolate the magnetic cores, and the materials used to protect them against the under-test substance, affect the electrical and magnetic properties of the sensor. In order to overcome this issue, in conventional sensors, the components of the magnetic system are separated from the polymer material using a secondary material such as a porous ceramic cement. A very limited group of materials with unique properties can be used for this purpose. The process and material expenses for the secondary material add a significant cost to the manufacturing process of the sensor. Furthermore, the secondary material affects the performance of the sensor. A limited group of materials can be used for the secondary isolation due to their required chemical, mechanical, electrical, and magnetic properties. Often, a third material such as a metal support is also required to mechanically protect the sensitive secondary insulator from external mechanical tensions. This invention presents a new packaging technique that allows for the use of a wider range of isolating materials for inductive conductivity sensors. It will significantly reduce the cost of producing the sensor, improve its precision and accuracy, and increase its sensitivity.

BRIEF DESCRIPTION OF THE SEVERAL VIEWS OF THE DRAWING

FIG. 1A, Prior Art, illustrates the simplest form of the toroidal conductivity sensor comprising a drive toroid, a receiving toroid, and a conductive material around the sensor making a current loop that transfers the energy from the driving toroid to the sensing toroid. FIG. 1B, Prior Art, illustrates the cross-section view of the simplest form of the toroidal conductivity sensor. This figure shows how a non-conductive, magnetically transparent material such as a corrosion-resistive polymer is employed to protect the magnetic core and wires from the under-test substance.

FIG. 2A, Prior Art, illustrates a shielding disk placed between two toroids preventing direct induction from the drive toroid to the sensing toroid. FIG. 2B shows the embodiment of a conventional toroidal conductivity measurement sensor. The sensor comprises a driving toroid, a sensing toroid, a shielding conductive disk, a corrosion-resistive polymer, a secondary insulating material, and metal casing.

FIG. 3, Prior Art, shows how the secondary insulating material makes a closed loop around the drive toroid and the sensing toroid, causing a current loop due to any electrical or magnetic conductivity of the material, resulting a transfer of energy from the drive toroid to the sensing toroid.

FIG. 5A shows an embodiment with two driving toroids and one receiving toroid, and FIG. 5B shows an embodiment with one driving toroid and two receiving toroids.

DETAILED DESCRIPTION OF THE INVENTION

Figure 4:
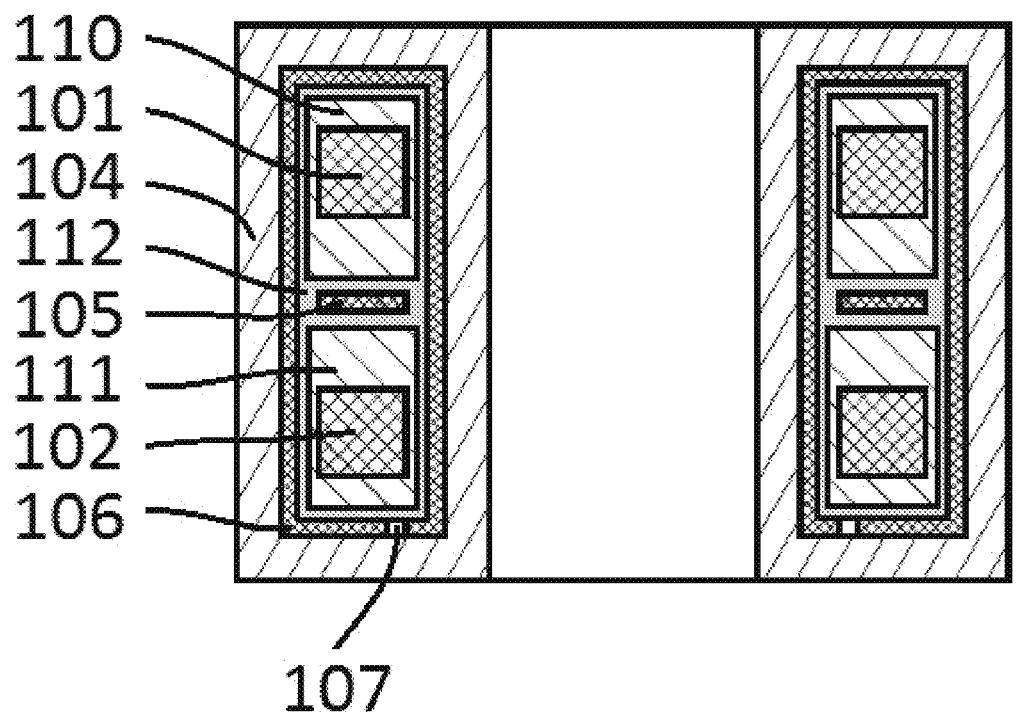
FIG. 4 shows the embodiment of this novel packaging for a toroidal conductivity-measurement sensor.

The simplest form of the toroidal conductivity sensor in prior art is illustrated in FIG. 1A. The sensor is comprised of a drive toroid 101 and a receiving or sensing toroid 102. A conductive material around the sensor makes a current loop 103 that transfers the applied energy from driving toroid 101 to sensing toroid 102. The electrical parameters of this measurement structure, when surrounded by the under-test substance, are affected due to electrical and magnetic properties of the under-test substance. As introduced in the prior art and as shown in FIG. 1B, a non-conductive, magnetically transparent material 104, often a corrosion resistive polymer, is employed to protect the magnetic core and wires from the under-test substance. The insulator 104 can also mechanically stabilize the sensor. The main problem of the sensor embodiment of FIG. 1B is the direct induction from the drive toroid 101 to the sensing toroid 102. To prevent the direct induction that affects the sensor's functionalities, as illustrated in FIG. 2A, a shielding disk 105 is placed between the two toroids. The shielding material 105 can be metal or any conductive material. It is also common to ground the shielding material 105.

It is known that the sensor embodiment of FIG. 1B or FIG. 2A is affected by the dielectric properties of the under-test substance. The corrosion-resistive polymer 104 is often a good dielectric material. Material 104, in combination with the under-test substance, affects the self-capacitance of the wires of the drive toroid 101 and the self-capacitance of the wires of the receiving toroid 102 and the mutual capacitance made between the wires of two toroids. The common technique to reduce the influence of the dielectric properties of the under-test material on the self-capacitance and mutual capacitance of the toroids is the use of a secondary insulating material 108. The insulating material 108 has a weak dielectric property or it has a spongy or porous structure that results a low equivalent capacitance. Materials that satisfy the criteria for insulator 108 can be brittle or sensitive to mechanical shocks. Hence, it is very common to employ a mechanically-stronger metallic casing to protect the insulator 108. The metal casing 106 also acts as a shielding cage to protect the sensor from external electromagnetic noises. It is also common to ground the metal casing 106 to improve its shielding properties. A gap 107, which can be an air-gap or filled with any non-conducting material, should prevent the metal casing 106 from making a closed loop as a conductor around either the drive toroid or the sensing toroid or both toroids. The embodiment of the conventional sensors is shown in FIG. 2B.

As shown in FIG. 3, material 108 makes a closed loop 109 around toroid 101 and toroid 102. Any electrical or magnetic conductivity of the material 108 results in a transfer of energy from the drive toroid 101 to the sensing toroid 102. A direct transfer of energy via loop 109 results in an error in the conductivity measurement. Considering this fact, it is obvious that a very limited group of materials can be used as material 108 in the sensor embodiment, because of their necessarily unusual electrical, magnetic, and dielectric properties. Material 108 should have four major properties: poor capacitance, high magnetic transparency, high magnetic reluctance, and low electrical conductivity. Any degradation of material 108 over time can affect at least one of these four properties and result in a significant decline in the sensor's accuracy.

This invention presents a new structure that eliminates the dependence of the sensor on a practically unique material 108. In this novel technique, as shown in FIG. 4, a magnetically transparent, non-electrically conductive material 112 is employed to separate the toroids. The toroid 101 and the material 110 around toroid 101 are separated from toroid 102 and the material 111 around toroid 102 using a shielding material 112. Material 110 and material 111 have poor capacitance and are magnetically transparent. This innovative invention allows the use of a wider range of substances as materials 110 and 111, including a wider group of ceramic compounds with better mechanical properties that do not require a metal structure for mechanical protection. This includes, but is not limited to, any porous cements and spongy polymers and foams. Preventing a closed loop of material 110 or material 111 around both toroids (similar to loop 109 in FIG. 3) in the new embodiment significantly reduces the measurement error. Avoiding a metallic casing 106, or reducing its thickness, results better sensitivity in conductivity measurement. The simplest embodiment for this invention is shown in FIG. 4. The sensor embodiment of FIG. 4 also includes an optional thin conductive layer 106 for shielding purposes. This conductive layer includes a gap 107 that can be an air-gap or filled with any non-conducting material. The gap 107 prevents the conductive layer 106 from making a conductive closed loop around either drive toroid 101, or sensing toroid 102, or both toroids. The conductive layer 106 can be grounded to improve its shielding properties. As shown in FIG. 4 the preferred embodiment for the sensor also comprises a shielding disk 105 that prevents the direct transfer of energy from toroid 101 to toroid 102. The shielding disk 105 can also be grounded to improve its shielding properties.

The idea of using a magnetically transparent, non-electrically conductive material 112 to separate the driving toroid from the receiving toroid, and using two separate magnetically transparent materials 110 and 111 with poor capacitance around the toroids, can also be used for inductive conductivity sensors with 3 toroids. Conductivity sensors with three toroids are commonly used to achieve a higher precision and higher accuracy measurement. A sensor structure with one driving toroid and two receiving toroids (connected in series) is commonly used to achieve higher sensitivity, and a sensor structure with two driving toroids (connected in series) and one receiving toroid is known to be less sensitive to external noise.

Figure 5A:
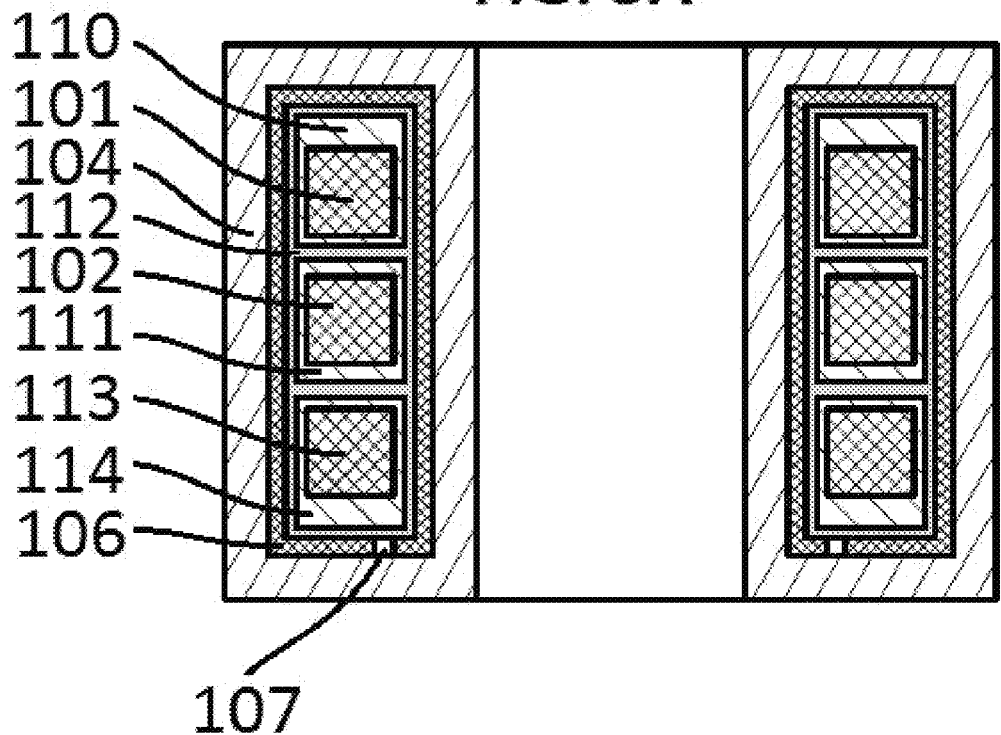
FIGS. 5A and 5B show the embodiment of this novel packaging for toroidal conductivity-measurement sensors with 3 toroids.
Figure 5B:
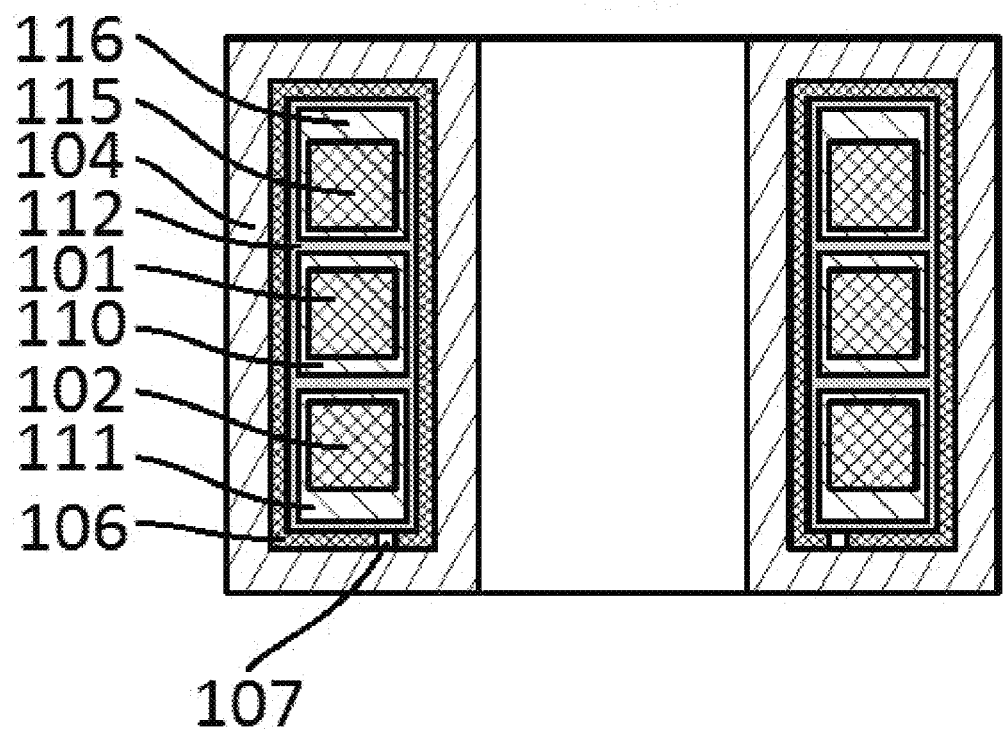

In the sensor embodiment shown in FIG. 5A, the sensor comprises two drive toroids, 101 and 113, and one sensing toroid 102. Electromagnetically transparent components 110, 111, and 114, which have poor capacitance properties, surround the three toroids, and the toroids are separated from each other using insulator 112. This embodiment can also be practiced using one driving toroid and two receiving toroids as shown in FIG. 5B. In FIG. 5B the sensor comprises one drive toroid 101 and two sensing toroids 102 and 115. Electromagnetically transparent components 110, 111, and 116, which have poor capacitance properties, surround the three toroids, and the toroids are separated from each other using insulator 112.

I claim:

1. An improved inductive conductivity sensor, comprising at least one drive toroid structure or other electromagnetically analogous drive structure, and at least one receiving toroid structure or other electromagnetically analogous receiving structure, wherein all of these structures are at least partially submersed in a conductive test substance, and a current is applied to the drive toroid and measured at the receiving toroid so as to obtain a measurement of the conductivity of the test substance, wherein the improvement comprises: surrounding one or more of the drive and/or receiving toroid(s) with an insulating material that is magnetically transparent and has a weak dielectric property relative to the dielectric of the test substance resulting in a low equivalent capacitance to form an insulated unit, and surrounding each insulated unit, and separating the insulated units from each other, with a magnetically transparent and non-electrically conductive shielding material.

2. The sensor of claim 1, wherein each insulated unit is provided with one or more toroidally-shaped conductive shields located between the one or more drive and receiving toroids.

3. The Sensor of claim 1, wherein the shielding material is in turn surrounded by a layer of a conductive material, which layer is provided with an air gap or other non-conductive interruption to prevent the layer from constituting a conductive closed loop around the drive and/or receiving toroid(s).

4. The sensor of claim 3, wherein each insulated unit is provided with one or more toroidally-shaped conductive shields located between the any or all of the toroids.

5. The Sensor of claim 1, wherein there are a plurality of drive toroids and one receiving toroid, or one drive toroid and a plurality of receiving toroids.

6. The sensor of claim 5, wherein each insulated unit is provided with one or more toroidally-shaped conductive shields located between the toroids located within said insulated unit.

7. The Sensor of claim 5, wherein the shielding material is in turn surrounded by a layer of a conductive material, which layer is provided with an air gap or other non-conductive interruption to prevent the layer from constituting a conductive closed loop around the toroids surrounded by said conductive material.

8. The sensor of claim 7, wherein each insulated unit is provided with one or more toroidally-shaped conductive shields located between the toroids located within said insulated unit.

* * * * *